United States Patent [19]
Fukahori et al.

[11] Patent Number: 5,280,316
[45] Date of Patent: Jan. 18, 1994

[54] CAMERA WITH BUILT-IN FLASH DEVICE

[75] Inventors: Hidehiko Fukahori; Naoya Saito, both of Kanagawa; Shigeru Yamagami, Tokyo, all of Japan

[73] Assignee: Canon Kabushiki Kaisha, Tokyo, Japan

[21] Appl. No.: 766,843

[22] Filed: Sep. 27, 1991

[30] Foreign Application Priority Data

Oct. 4, 1990 [JP] Japan .................................. 2-267062
Oct. 4, 1990 [JP] Japan .................................. 2-267065

[51] Int. Cl.⁵ .......................................... G03B 15/03
[52] U.S. Cl. ........................................... 354/149.11
[58] Field of Search ................ 354/149.1, 149.11, 126, 354/145.1

[56] References Cited

U.S. PATENT DOCUMENTS 4,893,140 1/1990 Yamamoto et al. ............ 354/149.11
4,970,539 11/1990 Sasagaki et al. .................. 354/149.1

Primary Examiner—David M. Gray
Attorney, Agent, or Firm—Robin, Blecker, Daley & Driscoll

[57] ABSTRACT

A camera of the kind having a built-in flash device, which is movable to a usable position by popping up the flash device from its stowed position in using the flash device, is arranged such that the lens panel of the flash device is formed with split panels, and the flash device can be stowed in a compact state by causing the split panels to overlap each other when the flash device is in the stowed position.

8 Claims, 5 Drawing Sheets

FIG.1
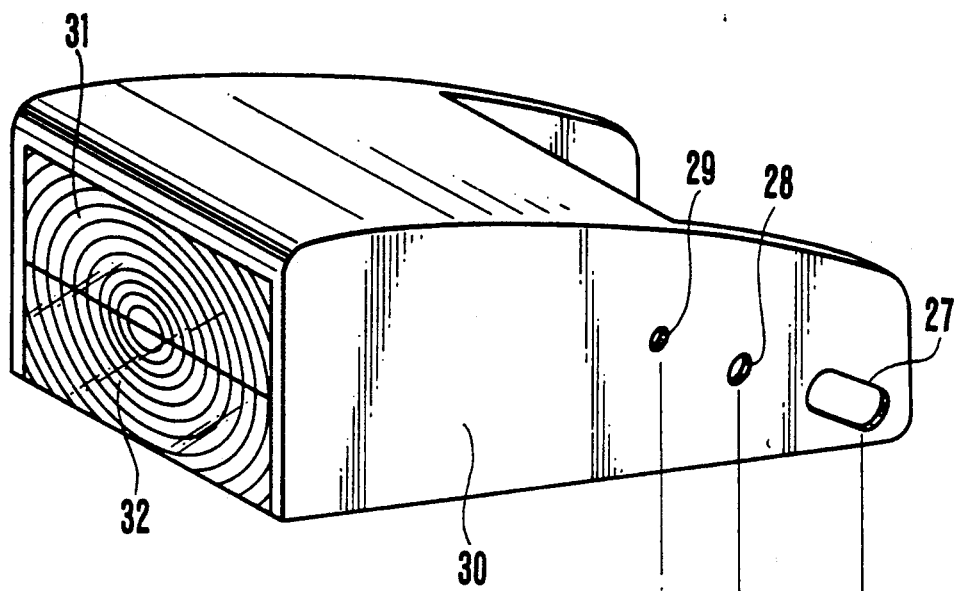
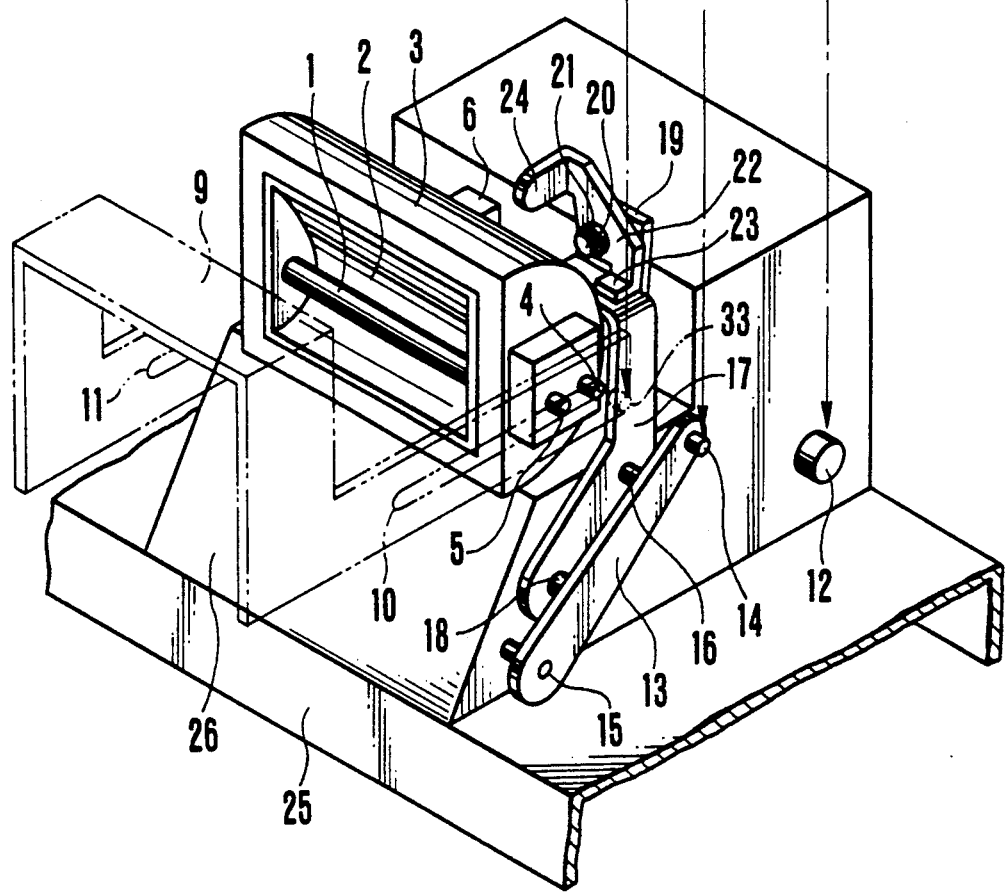

CAMERA WITH BUILT-IN FLASH DEVICE

BACKGROUND OF THE INVENTION

1. Field of the Invention

This invention relates to a camera having a pop-up type flash device which is arranged to move from a stowed position to a usable position.

2. Description of the Related Art

It is desirous to have a flash device of a high guide number for high-quality flash photography. To meet this requirement, flash devices of varied types having high guide numbers have been proposed. For forming a flash device of a high guide number, it is known to increase the capacity of a capacitor, to use a larger xenon discharge lamp, to increase the size of the lens panel disposed in front of the xenon discharge lamp and so on. Further, for making the guide number larger, it has been practiced to do zooming by moving back and forth a unit consisting of the xenon discharge lamp and a reflection shade in such a way as to use the unit in a position most efficient for a photo-taking lens in use.

However, the conventional method of forming the high-guide-number flash device by increasing the size of the capacitor, that of the xenon discharge lamp or that of the lens panel hinders a reduction in size of a camera of the kind having a built-in flash device or even a camera arranged to use an external flash device.

In the case of the camera having a built-in flash device, in particular, an increase in capacity of the capacitor causes an increase in size of the camera as a whole. In addition to the increase in size, the increased capacity requires a longer period of time in charging the capacitor and is thus very disadvantageous for quick flashing.

Further, an increase in size of the xenon discharge lamp results in an increase in the size of a part located above a pentagonal prism only in the film feeding direction. It is thus impossible to efficiently increase the guide number. Besides, the larger xenon discharge lamp makes designing work difficult.

The guide number can be increased by widening the lens panel disposed in front of the xenon discharge lamp. However, the larger lens panel presents a problem with respect to stowing arrangement for stowing the lens panel when the flash photography is not required. The use of a larger lens panel, therefore, has not been proposed for the pop-up type flash device.

Further, the conventional flash device which is of the kind having a variable illuminating angle and is shiftable between a usable (or service) position and a stowed position is arranged, as disclosed in Japanese Laid-Open Patent Application No. SHO 63-195638, etc., to move to the stowed position or the usable position and to change the illuminating angle by means of a continuously extended cam arrangement. Further, the series of these actions are arranged to be carried out by using a special motor as a drive source.

In the case of the example of the conventional arrangement described above, a flash-device stowing cam is arranged as an extension of an illuminating-angle varying cam. This arrangement increases a cam operating stroke and thus necessitates a stowing space to include room for the increased cam stroke. It is thus a drawback of the arrangement that the size of the flash device increases even in its stowed state. Another drawback lies in that the variable degree of the illuminating angle is insufficient as compared with the length of the cam operating stroke since the whole cam operating stroke cannot be fully used as an illuminating-angle varying stroke.

The flash device might be broken when it is touched by the user while the device is in the usable position. This problem is solvable by arranging a cover in such dimensions that can cover the flash device in the usable position. That arrangement, however, results in an increase in size of the camera. It is natural in the sense of the user that the user might wish to push the flash device by hand back to the stowed position after the flash device has moved to the usable position. Since the camera is to be taken up by hand and operated by a human being, it is important for the camera to be a tool which is user friendly.

SUMMARY OF THE INVENTION

One aspect of the invention under the present application lies in the provision of a camera having a built-in flash device, wherein a lens panel of the flash device can be stowed in a compact state in stowing the flash device.

One aspect of the invention lies in the provision of a camera wherein, in the above-stated aspect, the lens panel is composed of split panels and arranged to be compactly stowed by causing the split panels to overlap each other in stowing the flash device.

One aspect of the invention lies in the provision of a camera having a built-in flash device, wherein, in stowing the flash device, a flashing part unit is moved to a space between the flashing part unit and a flash device cover, so that the flashing part unit can be set into a compact state when the flash device is stowed.

One aspect of the invention lies in the provision of a camera wherein, in the above-stated aspect, a guide member which is provided for moving the flashing part unit in the shooting direction of a lens in using the flash device is arranged to be shifted toward the flash device cover in stowing the flash device, so that the camera can be brought into a compact state when the flash device is stowed.

The above and other aspects and objects of the invention will become apparent from the following detailed description of an embodiment thereof taken in connection with the accompanying drawings.

BRIEF DESCRIPTION OF THE DRAWINGS

FIG. 1 is an exploded oblique view showing an embodiment of this invention.

DETAILED DESCRIPTION OF THE PREFERRED EMBODIMENT

Figure 2:
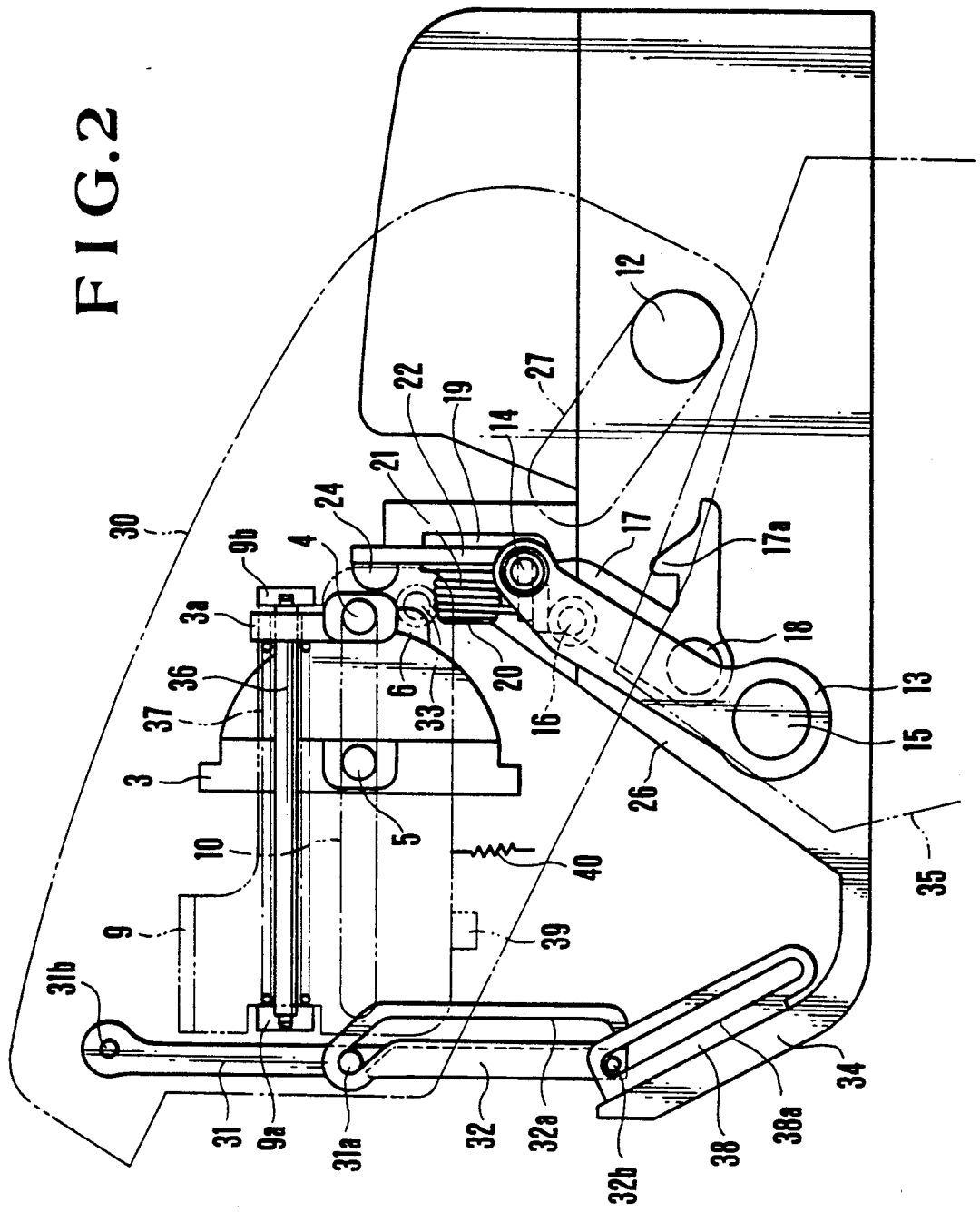
FIG. 2 is a side view showing a flash device as in a state of having moved to a usable position.

The following describes an embodiment of this invention with reference to FIGS. 1 to 5:

FIG. 1 is an exploded oblique view showing a whole arrangement according to this invention. A xenon discharge lamp (flash tube) 1 is secured to a reflection shade 2 and is carried by a reflection shade holder 3.

The reflection shade holder 3 has guide pins 4 and 5 and is arranged to be slidable relative to a guide member 9. A projection 6 is arranged on the rear surface of the reflection shade holder 3 to abut on a driving member when the reflection shade holder 3 slides. The guide member 9 is arranged to guide the sliding movement of the reflection shade holder 3 and is provided with a guide slot 10. The above-stated guide pins 4 and 5 slidably engage the slot 10. The guide member 9 has another guide slot 11 which is formed in a position opposite to the guide slot 10. Guide pins, which are not shown but are formed on the reflection shade holder 3 in the same shape as the guide pins, 4 and 5 engage the guide slot 11.

A guide pin 12 is used to guide a cover 30 when the cover 30 is moved between a usable position and a stowed position. A springing-up lever 13 has one end thereof rotatably carried by a rotating shaft 15 on the body 34 of the camera and has a pin 14 erected on the other end. Further, another pin 16 is erected on the springing-up lever 13 in a direction opposite to the pin 14. A zoom driving lever 17 is rotatably carried by a rotation shaft 18 on the camera body 34. The zoom driving lever 17 is provided with a bent-up part 19. A shaft 20 is erected on the bent-up part 19. A lever 22 is rotatably carried by the shaft 20. The lever 22 has a rotation stopper part 23 and a driving part 24 which is arranged to drive the reflection shade holder 3 by abutting on the projection 6 of the reflection shade holder 3.

The lever 22 is urged to rotate clockwise by a spring 21. However, the rotation of the lever 22 is arranged to be restricted when the above-stated rotation stopper part 23 comes to abut on the zoom driving lever 17. Meanwhile, the lever 22 is arranged to turn against the force of the spring 21 when a counterclockwise force is exerted on the lever 22.

A reference numeral 25 denotes an exterior fitting member. A numeral 26 denotes a slanting face member which has about the same inclination as the slanting face of a pentagonal prism 35. A numeral 30 denotes the cover of a flash device. The cover 30 of the flash device has a slot 27 which engages the above-stated guide pin 12 and a hole 28 which engages the pin 14. The counterclockwise rotation of the springing-up lever 13 causes the cover 30 to move to the usable position through a locus defined by the slot 27.

Figure 5:
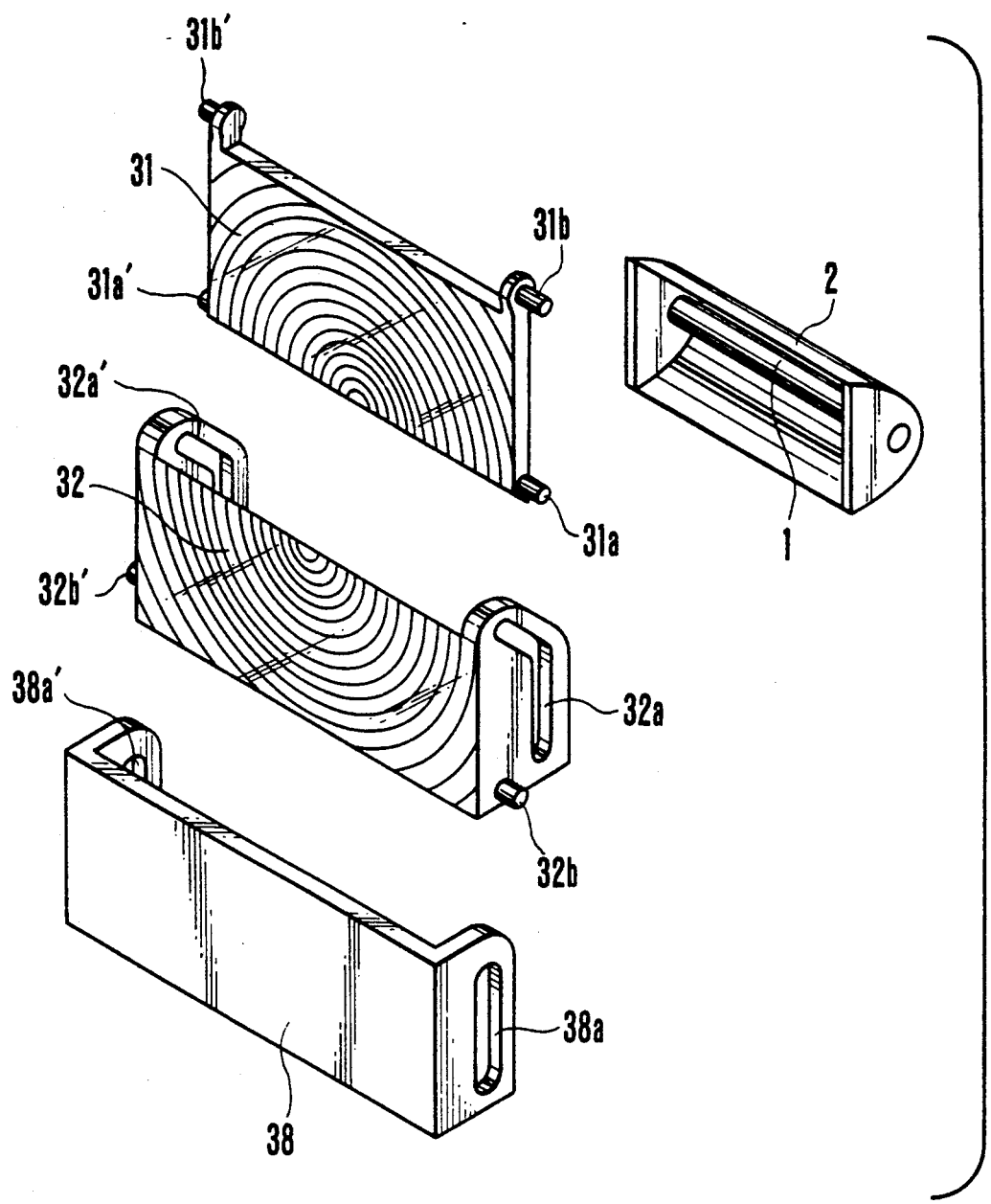
FIG. 5 is an exploded oblique view showing the details of a Fresnel lens arrangement.

A pin 33 which is erected on the above-stated guide member 9 rotatably engages a hole 29 which is provided in the cover 30. Since the guide member 9 is thus carried by the cover 30, the xenon discharge lamp 1, the reflection shade 2 and the reflection shade holder 3 are carried also by the cover 30. As shown in FIG. 2, the guide member 9 is urged by a spring 40 to rotate counterclockwise on the above-stated pin 33. The cover 30 is provided with a stopper part 39 for restricting the rotation of the guide member 9. Reference numerals 31 and 32 denote Fresnel lenses, which are obtained by dividing a Fresnel lens panel into two approximately at the center of the optical axis of the Fresnel lens panel. Referring to FIG. 5, pins 31a and 31a' are formed in one body with the Fresnel lens 31 on one side part of the Fresnel lens 31. Pins 31b and 31b' are formed likewise in one body with the Fresnel lens 31. The pins 31b and 31b' are rotatably carried by the cover 30. The Fresnel lens 32 is provided with guide slots 32a and 32a' which are bent to a degree more than the thickness of the lens part thereof, as best shown in FIG. 2. The above-stated pins 31a and 31a' slidably engage these guide slots 32a and 32a'. Further, pins 32b and 32b' are erected on both lower sides of the Fresnel lens 32. A stationary guide 38 is secured to the camera body 34 and has slots 38a and 38a'. The pins 32b and 32b' slidably engage these slots 38a and 38a'. A spring guide shaft 36 is secured to the holding parts 9a and 9b of the guide member 9 and has a compression coiled spring 37 arranged around the outer circumference thereof. One end of the spring 37 is abutting on the holding part 9a while the other end abuts on a spring hanging part 3a which is formed in one body with the reflection shade holder 3. The reflection shade holder 3 is thus urged to move by the spring 37 toward a film side in the direction of a photo-taking optical axis. The spring hanging part 3a has a through hole. The spring guide shaft 36 penetrates the through hole.

Next, the arrangement described above is further described with reference to FIG. 2. FIG. 2 shows the flash device as in a state of having moved to the usable position thereof. The springing-up lever 13 is urged to move counterclockwise by a spring which is not shown. Therefore, the cover 30 receives the urging force through the pin 14. The slot 27 is slidably engaging the guide pin 12. The cover 30 is thus in a state of having sprung up to a position where the movement of the cover 30 is restricted by the rear edge of the slot 27. Under this condition, the guide member 9 is urged by the spring 40 to a position determined by the pin 33 which rotatably engages the hole 29 of the cover 30 and the stopper part 39. With the guide member 9 in this position, the reflection shade holder 3 is located near to the center of the Fresnel lens panel which is composed of the Fresnel lenses 31 and 32. The reflection shade 2 is facing an object illuminating position. The pin 31b of the Fresnel lens 31 is pulled upward by the cover 30. The pin 31a is abutting on the upper end of the guide slot 32a of the Fresnel lens 32 to pull the Fresnel lens 32 upward. The pin 32b of the Fresnel lens 32 is abutting on the upper end of the slot 38a of the stationary guide 38. The position of the Fresnel lens 32 is thus restricted.

In this instance, the Fresnel lenses 31 and 32 are aligned almost on the straight and are facing in the direction of illuminating the object to be photographed with the light of the xenon discharge lamp 1 which is coming through the reflection shade 2.

The zoom driving lever 17 is then in its most retracted position. The lever 22 is turned by the urging force of the spring 21 to a position where the rotation stopper part 23 abuts on the zoom driving lever 17. The driving part 24 is in a state of leaving a slight amount of clearance between the driving part 24 and the projection 6 of the reflection shade holder 3. Therefore, the guide pin 4 of the reflection shade holder 3 is set by the urging force of the spring 37 in a position where the guide pin 4 is abutting on the rear end of the guide slot 10 of the guide member 9 (on the film side in the direction of the optical axis). Under this condition, the flash device has the narrowest illuminating angle and the maximum guide number thereof.

Next, the zooming movement of the reflection shade 2 is described as follows with reference to FIG. 3: the above-stated driving lever 17 is arranged to be driven by a motor or the like on the basis of information on the focal length of the photo-taking lens which is not shown. When the driving lever 17 is caused to turn counterclockwise by the motor, the driving part 24 comes to abut on the projection 6 of the reflection shade holder 3. The reflection shade holder 3 is thus caused to move in the direction of the photo-taking optical axis toward the lens against the force of the spring 37. The zooming position is determined by stopping the motor at a point necessary according to the information on the focal length of the lens. The motor may be arranged to cause the driving lever 17 to reciprocate by utilizing the forward rotation and backward rotation of the motor. It is also possible to use an endless cam in such a manner that the driving lever 17 is caused by the rotation of the motor in one of two directions to turn counterclockwise, according to the cam lift of the endless cam, and is caused by the force of the spring 37 to turn clockwise toward its original position when the driving lever 17 comes out from the cam lift. In the latter case, the rotation of the motor in the other direction can be used for other work, such as a shutter charging action. Therefore, the use of a special motor is not mandatory.

Figure 3:
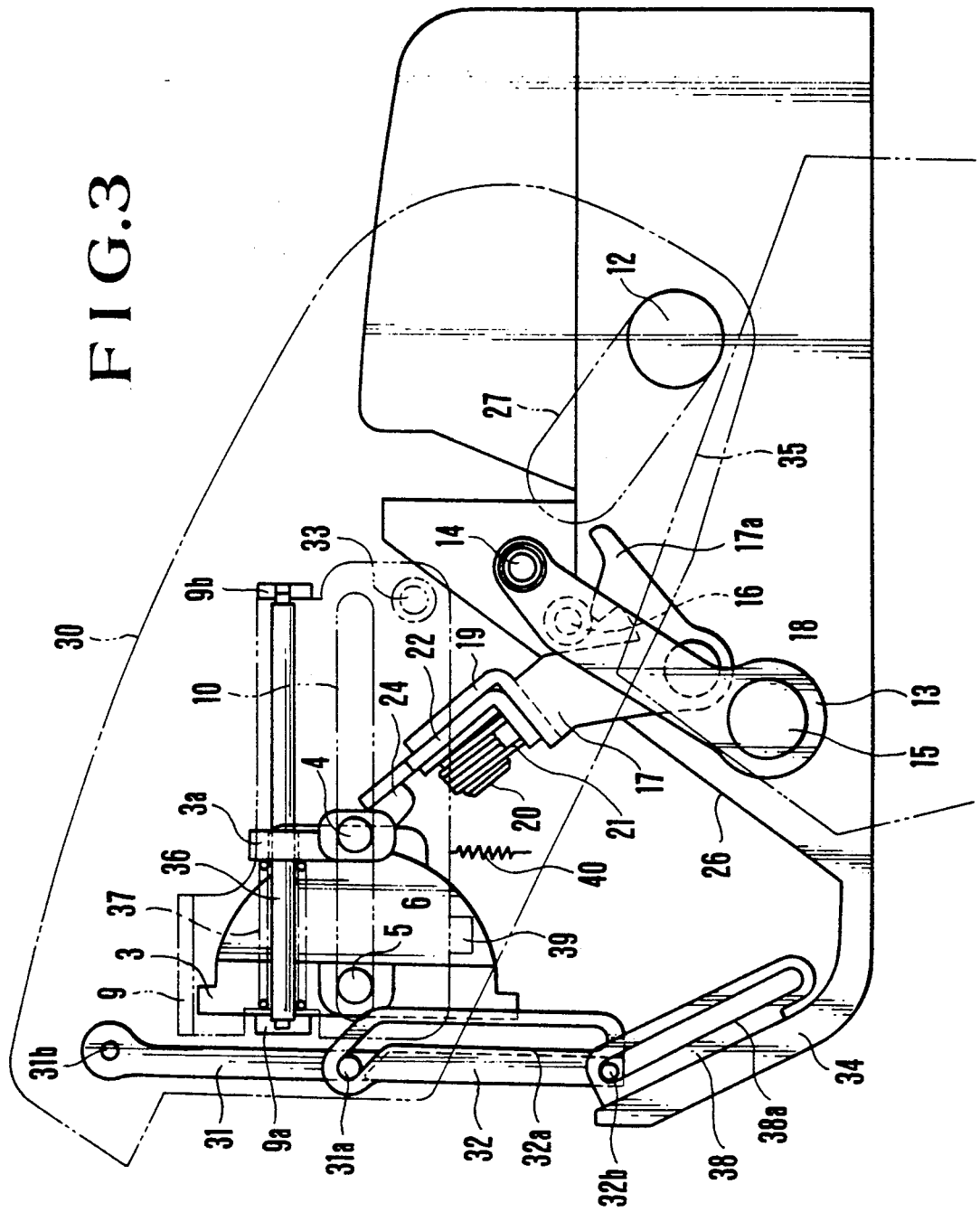
FIG. 3 is a side view showing the flash device as in a state of having changed its illuminating angle.

In stowing the flash device which is in the state as shown in FIG. 3, the cover 30 is pushed by hand. The movement of the cover 30 causes, through the pin 14, the springing-up lever 13 to turn clockwise on the rotation shaft 15. Then, the pin 16 abuts on the cam part 17a of the driving lever 17 to cause the driving lever 17 to turn clockwise. In this case, there is provided a known absorbing mechanism between the driving lever 17 and the motor. The clockwise turn of the driving lever 17 allows the reflection shade holder 3 to be moved by the spring 37 in the direction of the photo-taking optical axis toward the film side. Therefore, the reflection shade holder 3 moves together with the guide member 9 along the guide slot 10 according to the stowing movement of the cover 30 in the direction of the photo-taking optical axis toward the film side.

Figure 4:
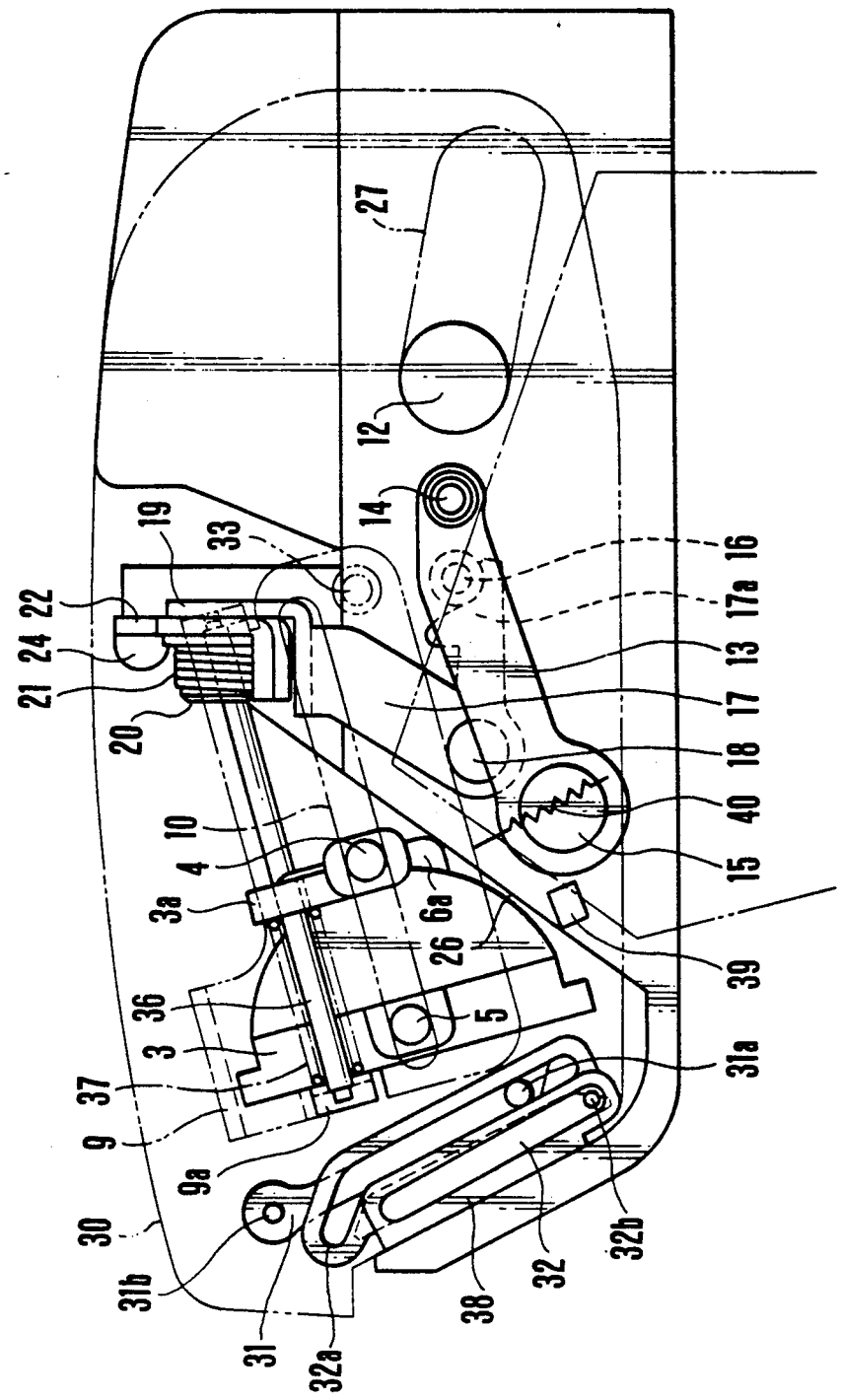
FIG. 4 is a side view showing the flash device as in a state of having moved to a stowed position.

The stowing movement of the Fresnel lenses 31 and 32 is as follows: in association with the stowing operation on the cover 30, the Fresnel lens 31 moves downward. The pin 31a of the Fresnel 31 moves downward along the guide slot 32a of the other Fresnel lens 32. As a result, the Fresnel lenses 31 and 32 which have been approximately on one straight line are restrictedly caused by the bent guide slot 32a to be stowed in a state of overlapping each other. Further, the pin 32b of the Fresnel lens 32 moves along the slot 38a of the stationary guide 38 to allow the Fresnel lens 32 to be stowed in a state as shown in FIG. 4. Referring to FIG. 4, when the guide part 6a of the reflection shade holder 3 comes, during the stowing process, to abut on the slanting face 26 while the reflection shade holder 3 is moving in the direction of the optical axis toward the film side according to the stowing movement of the cover 30, the movement of the reflection shade holder 3 is restricted by the slanting face 26. Therefore, after that, the reflection shade holder 3 slidingly moves against the force of the spring 37, with its guide part 6a in the state of abutting on the slanting face 26, in the direction of the photo-taking optical axis toward the lens side as the cover 30 is further pushed down by hand. With the process of stowing further progressing, the guide member 9 turns clockwise on the pin 33 against the force of the spring 40. The center of the reflection shade holder 3, which has been located in the neighborhood of the center of the Fresnel lens panel of the Fresnel lens 31, deviates from the latter to allow the guide member 9 to be stowed within a minimum space. In other words, the guide member 9 is stowed by moving it in the direction of a dead space between the cover 30 and the guide member 9. The lever 22 is also stowed within a minimum space with the driving part 24 being pushed by the cover 30 near the final stowing position of the cover 30 to cause the lever 22 to turn counterclockwise against the force of the spring 21.

When the flash device is again moved to its usable position, the Fresnel lenses 31 and 32 are spread from their stowed state to a usable state. Further, reflection shade holder 3 is caused by the urging force of the spring 37 to ascend while moving toward the film side in the direction of the photo-taking optical axis in association with the movement of the cover 30. Since the driving lever 17 is released from the restriction imposed by the springing-up lever 13, the driving lever 17 is released from the absorbing mechanism which is not shown and is thus allowed to come back to its previous position. The reflection shade holder 3 comes back to its previous position to be restricted by the driving part 24 of the lever 22.

In the case of this embodiment, the flash device is arranged to be manually moved to its usable position. However, this arrangement may be changed so as to move the flash device to the usable position by driving the springing-up lever 13 with a motor.

What is claimed is:

1. A camera having a flash device arranged to be movable between a flash-device non-usable position and a flash-device usable position, comprising:
    a) a flash tube; and
    b) a lens panel disposed in front of said flash tube, said lens panel being split into split panels which are arranged to overlap each other at least in part when the flash device is in the flash-device non-usable position.

2. A camera according to claim 1, wherein said split panels are arranged to present an approximately planar shape in front of said flash tube when the flash device is in the flash-device usable position.

3. A camera according to claim 2, wherein said split panels are interconnected in such a way as to be slidable along a panel plane of said lens panel and are arranged to slide along the panel plane into a mutually overlapped state in association with the movement of the flash device from the flash-device usable position to the flash-device non-usable position.

4. A camera having a built-in flash device having a flash-device cover part arranged to be movable between a usable position where the flash-device cover part is in a state of being raised relative to a body of the camera and a stowed position where the flash-device cover part is in a state of being lowered relative to the body of the camera from the usable position, a flashing unit being disposed within said cover part, comprising:
    a) a split panel having at least a first panel part and a second panel part which are interconnected in such a way as to be movable relative to each other, said split panel being arranged to have said first and second panel parts positioned to approximately form a plane when the flash-device cover part is in the usable position, said first and second panel parts being arranged to be moved in the direction of overlapping each other according to the movement of the flash-device cover part to the stowed position.

5. A camera according to claim 4, wherein one end of said split panel is connected to the flash-device cover part.

6. A camera according to claim 4, wherein said flash device has a flash-device stowing case part which is stationarily disposed on the side of the body of the camera, and wherein said split panel is arranged to approximately present a plane between the flash-device cover part and the flash-device stowing case part when the flash-device cover part is in the usable position.

7. A camera according to claim 6, wherein said split panel is stowed within the flash-device stowing case part in a state of having said first and second panel parts overlapping each other when the flash-device cover part is in the stowed position.

8. A camera having a built-in flash device having a flash-device cover part arranged to be movable between a usable position where the flash-device cover part is in a state of being raised relative to a body of the camera and a stowed position where the flash-device cover part is in a state of being lowered relative to the body of the camera from the usable position, a flashing unit being disposed within said cover part, comprising:

a) a panel arranged to move in association with the flash-device cover part in such a way as to form a plane in front of the flashing unit when the flash-device cover unit is in the usable position and to have a part thereof displaced relative to another part thereof when the flash-device cover part moves to the stowed position.

* * * * *